United States Patent Office 2,777,991
Patented Jan. 15, 1957

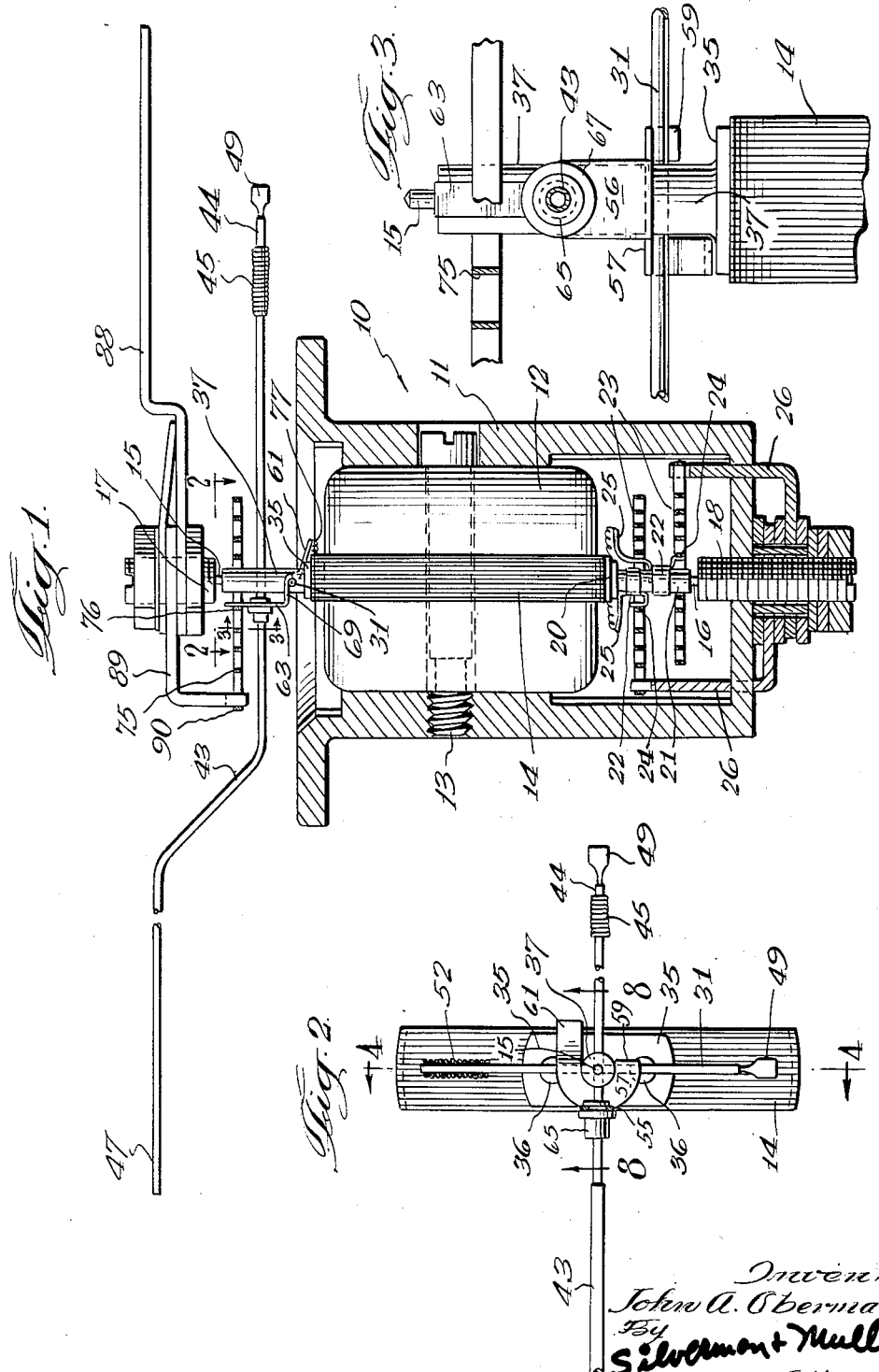

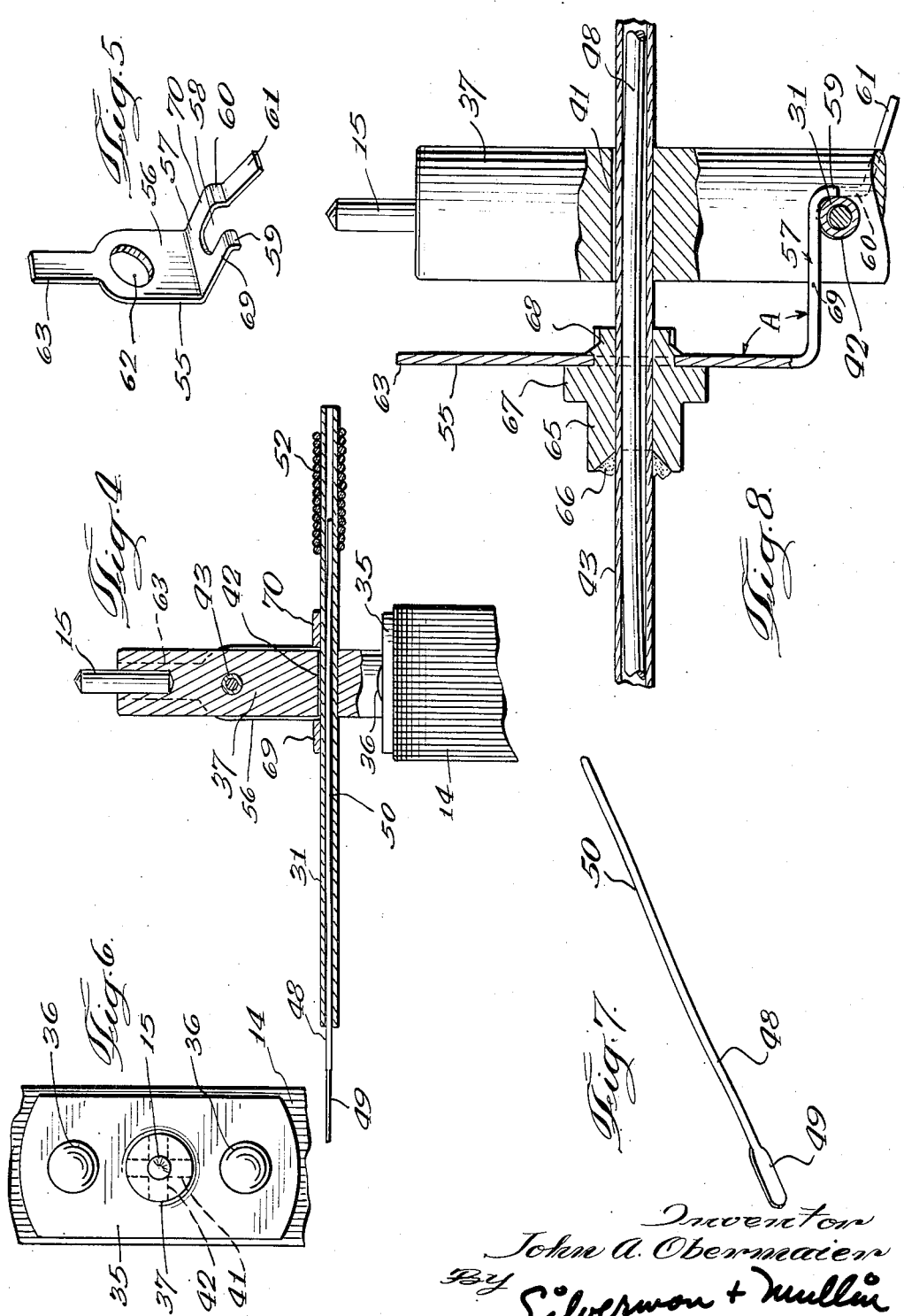

2,777,991
GALVANOMETER CONSTRUCTION
John A. Obermaier, River Forest, Ill.

Application August 3, 1953, Serial No. 372,092

2 Claims. (Cl. 324—155)

This invention relates generally to a galvanometer construction and more particularly is concerned with that portion of the galvanometer which carries the indicator or needle.

In the usual D'Arsonval movement there is provided a coil which rotates or swings within a magnetic field. Through the passage of current through the coil and against the tension of a spring, there is a change in the orientation of the coil with respect to the field. Since the needle is carried by the coil, the same may be collaborated in terms of the electrical quantities affecting the coil, such as current and voltage. It is usual to mount the moving coil between jewel bearings, the coil usually having pivot points engaging the bearings, and, hence, it is obviously greatly desired to decrease the friction between the bearing points and the bearings as much as possible. As for such wear that actually occurs, this can be further minimized by assuring perfect balance of the coil. The usual galvanometer movement requires a laterally extending needle or pointer which must be counterbalanced, and the problem becomes one of very fine adjustment of counterbalancing means to take care of the off-set needle weight.

The usual construction of a galvanometer utilizes a coiled hair spring as a conductor of current in addition to providing the opposing force necessary to achieve a condition of equilibrium for the needle. Ideally, this spring provides as little opposition to rotation of the coil as possible, and obviously the sensitivity of a given meter, that is movement per unit current, depends to a great measure upon the size of this spring.

A principal object of the invention lies in the decreasing of the weight of the needle assembly so that the spring itself may be considerably decreased in size.

In connection with the necessity for the spring carrying current, it is not unusual for meters to be subjected to excesses of current, and under these circumstances, it is usually the coiled hair spring that fuses. Replacement of the hair spring in prior galvanometers has been a difficult problem because the spring has normally been secured to a stub shaft of the pivot base. This has required re-soldering, etc. Furthermore, when meters are subjected to excessive current, the pointers are damaged and require replacement. Because of the construction of former galvanometers, pointers have been required to be soldered or brazed to the stub shaft of the pivot base, and it has been difficult to replace such needles or pointers.

An important object of the invention is to provide a pointer or needle which is firmly held to the stub shaft of the pivot base without solder, to provide a removable saddle arrangement which retains the needle or pointer in its position but which permits the pointer very quickly to be disassembled from the stub shaft, and to provide novel means for securing the hair spring to the stub shaft.

Other objects of the invention lie in the provision of novel balancing means for the needle.

Still a further object of the invention is to provide a novel cross-arm balance which cooperates with the saddle arrangement not only to hold the pointer in place, but as well as to hold its own position.

Many other objects of the invention will become apparent as the description proceeds. The general purposes of the invention, among others, are to provide a lightweight, easily disassembled galvanometer construction so that the parts are readily removed and do not require soldering or brazing in order to retain the same in assembled condition. And furthermore, by virtue of the construction, it is enabled to provide easily and more effectively balanced condition for the moving part of a galvanometer through the use of extremely fine adjusting means.

Variations are capable of being made in the proportions and shape of various of the parts to be described, but it is intended in no way to be limited by the specific details of the description and the specification which follows. In this explanation, and in order to comply with the patent statute relating thereto, I have described a preferred embodiment of my invention in considerable detail, and I have illustrated the same in the attached drawings so that a complete understanding of the same may be achieved by those skilled in the art to which the same appertains.

In the figures in which the same characters of references are used to designate the same or similar parts throughout the several figures of the drawings:

Fig. 1 is a sectional view with portions in elevation, illustrating the principal parts of a galvanometer movement constructed in accordance with my invention.

Fig. 2 is a top plan view of the moving coil portion thereof, including the pointer and cross-arm balance, taken along the line 2—2 of Fig. 1, with none of the support structure or the field structure illustrated.

Fig. 3 is a sectional view taken generally along the line 3—3 of Fig. 1 and illustrating, on an enlarged scale, the construction of the pointer saddle.

Fig. 4 is a median sectional view taken through the cross balance arm along the line 4—4 of Fig. 2 and in the direction indicated.

Fig. 5 is a perspective view of the saddle member disassembled from the remainder of the device.

Fig. 6 is a top view of the stub shaft of the pivot support, neither the pointer nor the cross balance arm being shown.

Fig. 7 is a perspective view of the micrometer weight used for fine adjustments of balance, either in the cross balance arm or the pointer.

Fig. 8 is a sectional view on a greatly enlarged scale taken generally along the line 8—8 of Fig. 2 and in the indicated direction.

Referring now to the drawings, the reference character 10 designates generally a galvanometer of the D'Arsonval or moving coil type which is constructed in accordance with my invention. With respect to the said galvanometer, only that portion at the upper end of the moving coil is of interest, the remainder being generally well-known in the art. I have illustrated a cylindrical housing 11 forming the soft iron pole pieces and having on the interior thereof a soft iron core 12, held in place by any suitable fastening means 13. There is provided a rectangular moving coil 14 mounted on a suitable frame member which is intended to pivotally swing about a vertical axis in the uniform field between core and housing and as such has pivot points 15 and 16 engaging in suitable adjustable bearings 17 and 18. Referring for the moment to the lower portion of the meter, there is a pivot base 20 secured to the bottom end of the moving coil 14 by cement or the like, and having a stub shaft 21 to which are secured one or more clips 22. These clips have hair springs coiled in planes perpendicular to the axis of movement of the coil 14, there being two shown at 23, although it is usual that there be only one. The inner convolution of each of the springs 23 is secured to a lug, formed at each clip as at 24, in an electrical connection. This can be done by soldering. Extensions of the clips, as shown at 25, are electrically connected through suitable leads to the moving coil 14. The outermost connection of each of the hair springs 23 is respectively connected to electrical conductors 26 and are thence led to suitable junctures for electrical connection into circuits.

As previously explained, the construction of the lower end of the meter is of no importance to this invention and, hence, will not be referred to hereinabove.

Considering the upper end of the meter, it will be noted that there is a pivot base 35 secured to the top end of the moving coil 14, for example, by cement. The pivot base 35 is generally rectangular as shown in Fig. 6 and has weight-reducing openings 36 therein, which aid in securement to the coil 14. The pivot base has an upwardly extending stub shaft 37 to which is mounted a pivot point 15. Intermediate its ends, the stub shaft is provided with a pair of transverse openings, one being designated 41 and the other being designated 42, these openings being for the purpose of accommodating respectively the pointer 43 and the cross arm balance 44.

Considering first the pointer 43, the same is constructed of hollow, lightweight tubing, such as, for example, aluminum, of such diameter as readily to be slidable within the opening 41. The pointer tail 44 has a length of tightly coiled spring 45 slidable thereon, which may be adjusted along the length of the pointer to balance the weight of the indicating end 47. For fine adjustments, there is a central telescoping rod 48, illustrated in Fig. 7, having a flattened end 49 and a slight bend 50 intermediate its ends. The rod is slid in and out of the tube end 44 in order to achieve fine balance adjustments. The bend 50 causes slight binding on the interior of the tube forming the pointer 43 so that there is a tight fit within the same, and so that any position to which the same may be adjusted may be maintained.

As seen in Figs. 4 and 8, spaced below the pointer 43 there is disposed the cross arm balance 31 which is disposed within the opening 42 as mentioned above. The cross-arm is a rectilinear tube as compared to the pointer 43 which may have several bent places in the same, and which is provided on one end with a coil spring 52 of construction like the coil spring 45. The substantially identical telescoping rod 48 with its flattened end 49 and central bend 50 is engaged within the interior of the tube, forming the cross arm balance 44.

Referring now to Fig. 5, there is illustrated what has been termed the pointer saddle 55. It will be noted that same comprises a vertical relatively wide body 56 having a right angle bent portion 57 integrally formed therewith and provided with a central slot 58 opening to the end of the portion 57. A pair of downwardly bent hook formations 59 and 60 are provided at the free end of the portion 57, with the hook formation 60 having an extension lug 61 integrally formed therewith. The body portion 56 has a central opening 62 by means of which the saddle is secured to the pointer and there is an upwardly directed extension or contact lug 63 integrally formed with the body 56. Referring now to Fig. 8, the pointer 43 has a bushing 65 soldered thereto as at 66 and provided with an annular flange 67, forming a shoulder against which the body portion 56 is engaged. The reduced diameter portion 68 is swaged over edges of the opening 62 thereby permanently retaining the bushing, saddle and pointer in assembled relationship. The slot 58 (Fig. 5) gives rise to what may be termed bifurcations 69 and 70. These bifurcations are resilient since it is preferable to form the saddle member 55 of some resilient material such as Phosphor bronze, and in its normal unassociated condition, the angle between the portion 57 and the body 56 is greater than the angle when the device is assembled. For example, such angle A, as shown in Fig. 8, is approximately 90° while before assembly, the same angle, in Fig. 5, is perhaps 10° or 15° more. In assembly the pointer 43 is inserted in the opening 41 and moved until the hook portions 59 and 60 are approximately at the opening 42. The bifurcations 69 and 70 are then raised, thereby applying tension, and the cross balance arm 44 is slid into the opening 42, and the bifurcations released. The resilience of the bifurcations 69 and 70 will retain both the cross balance arm and the needle, frictionally engaged within their respective openings and yet readily removable from the stub shaft 41 of the pivot base 40. The hook portions 59 and 60 matingly engage with and seat upon the cross arm balance 31.

It is not believed necessary to describe the manner in which balance is obtained, but suffice it to say that this may be achieved by moving the wire weights 52 and 45 and then making fine adjustments with the telescoping central rod members 48. The inner convolution of the upper hair spring 75 is soldered or brazed to the extension 63, as shown at 76 in Fig. 1. The electrical lead 77 from the coil 14 is soldered to the lower end of the extension 61. The framework 88 supports the upper bearing 17 and also provides an arm 89 to which the outer convolution of the upper hair spring 79 is secured, as at 90.

It will be obvious that the device is disassembled (after opening the joint 76 and disconnecting the lead 77) by sliding out the cross balance arm 37. This is done by raising the bifurcations 69 and 70 with any suitable tool. Once the tension has been released on the saddle member 55, the pointer is easily retracted from its opening 43. If necessary, the central rod member and the weight 45 are first removed.

It is important to point out that the pointer and cross arm balance may be disassembled from the galvanometer without in any way disturbing the moving coil or its pivot base or stub shaft. The significance of this is that repairs to meters and the replacement of parts is a speedy and economical process.

It is believed that the invention has been fully explained such as to enable one skilled in the art to which the same appertains to use and construct the same, and it is desired to point out that variations are possible without in any way departing from the spirit or scope of the invention as defined in the appended claims.

What is desired to secure by Letters Patent of the United States is:

1. A pointer system for a galvanometer of the moving coil type having a pivot base mounted to the coil and a stub shaft provided with a pivot point journalled to permit swinging movement of the coil comprising; an elongate pointer and a cross arm member both mounted normal to the shaft and slidable therethrough and the shaft having transverse openings therein for accommodating said pointer and cross arm member, said cross arm member and pointer being perpendicular one relative the other, a tension member spaced from said shaft and secured to said pointer and having a resilient extension bearing against the cross arm member and exerting a force thereon parallel with the axis of said stub shaft and in a direction away from the said pointer to exert binding friction of said pointer and cross arm member within their respective openings to retain same engaged to said stub shaft, said tension member being substantially L-shaped, one part of the tension member arranged perpendicular to the pointer axis and attached thereto, and the other part of the tension member being bifurcated and arranged in a plane substantially perpendicular to the shaft straddling the same and engaging the cross arm member on opposite sides of said shaft, at least one of the bifurcations having an integral continuation protruding beyond the cross arm member for providing an electrical terminal, said one part having a hair spring securing lug integral therewith.

2. A pointer system for a galvanometer of the moving coil type having a pivot base mounted to the coil and a stub shaft provided with a pivot point journalled to permit swinging movement of the coil comprising; an elongate pointer and a cross arm member both mounted normal to the axis of the shaft and slidable therethrough, said shaft having transverse openings for accommodating the pointer and cross arm therein arranged perpendicular one relative the other, and tension means for retaining the pointer and cross arm member engaged within their respective openings in the shaft comprising a resilient strip member having a part laterally spaced from the axis of the shaft and secured to said pointer and a resilient extension of said part bearing against the cross arm member and through which the shaft is passable freely, said extension exerting a force against the cross arm parallel with the axis of the shaft and in a direction away from the pointer to exert binding friction of said pointer and cross arm member within their respective openings, said strip member being substantially L-shaped with said part and extension integrally connected, said part arranged perpendicular to the pointer axis and attached thereto, said extension being bifurcated and arranged in a plane substantially perpendicular to the shaft with the bifurcations straddling the shaft and engaging the cross member on opposite sides of the shaft and arranged to form a channel to freely pass the shaft laterally therethrough.

References Cited in the file of this patent

UNITED STATES PATENTS

| | | |
|---|---|---|
| 1,155,095 | Porter | Sept. 28, 1915 |
| 1,467,972 | Beckert | Sept. 11, 1923 |
| 2,433,165 | Simpson | Dec. 23, 1947 |
| 2,660,147 | Bowditch | Nov. 24, 1953 |